3,023,203
POLYMERIZATION PROCESS
Robert F. Dye, Bartlesville, Okla., assignor to Phillips Petroleum Company, a corporation of Delaware
Filed Aug. 16, 1957, Ser. No. 678,687
3 Claims. (Cl. 260—94.9)

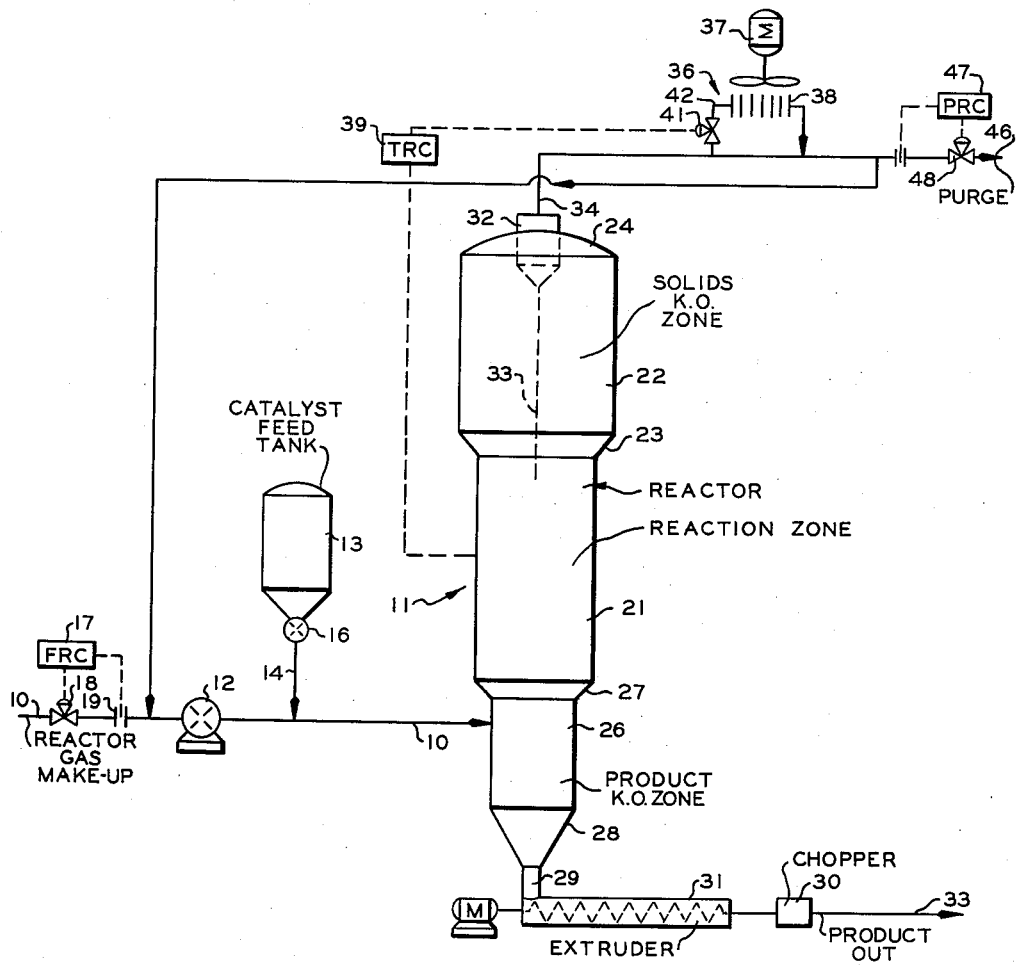

This invention relates to the production of solid olefin polymers. In one aspect, it relates to an improved reactor system for use in the polymerization of olefins. In another aspect, it relates to a process for the gas phase polymerization of olefins in the presence of relatively small amounts of a mobile solid polymerization catalyst to form high molecular weight solid polymers.

Various methods are described in the literature for producing normally solid and semisolid polymers. For example, hydrocarbons, such as ethylene, propylene, isobutene, butadiene, and styrene, can be polymerized, either independently or in various admixtures with one another, to produce solid and semisolid polymers. Recently, considerable attention has been directed toward the production of solid olefin polymers, such as polymers of ethylene and/or propylene. The polymerizations are frequently carried out in the presence of a solid catalyst, utilizing a liquid solvent as the reaction medium. As disclosed in detail hereinafter, the present invention is concerned with a process and system for conducting such polymerizations in the gaseous phase.

It is an object of this invention to provide an improved reactor system for use in the production of solid polymers.

Another object of the invention is to provide a polymerization process for producing high molecular weight solid polymers, utilizing a fluidized solid catalyst system.

Still another object of the invention is to provide a process for the gas phase polymerization of olefins, which does not require the use of a liquid solvent as the reaction medium.

A further object of the invention is to provide a process for the gas phase polymerization of olefins in which the product produced is suitable for most uses without further treatment to remove catalyst.

A still further object of the invention is to provide a polymerization reactor system in which the product obtained is in a form particularly suitable for handling and storage.

Still other objects, advantages and features of the invention will become apparent to those skiledl in the art upon consideration of the accompanying disclosure.

The instant invention is concerned with an improved reactor system and its use in a polymerization prccess. In one embodiment, the invention resides in an improved polymerization reactor system which comprises a series of three superposed upright shells, hereinafter referred to as upper, intermediate, and lower shells, the diameters of the shells being graduated from top to bottom with the upper shell having the largest diameter, a feed inlet conduit means attached to the upper portion of the lower shell, a catalyst inlet means connected to the feed inlet conduit means, a gas-solids separation means disposed within the upper shell, conduit means attached to the bottom of the gas-solids separation means and extending downwardly into the intermediate shell, a gas outlet conduit means attached to the upper portion of the gas-solids separation means, a solids outlet conduit means connected to the lower shell, and an extruder positioned below the lower shell and having its feed inlet connected to the lower end of the solids outlet conduit means. The gas outlet conduit means is preferably connected to the feed inlet conduit means in order that gaseous material removed from the gas-solids separation means can be recycled to the reactor. An indirect heat exchange means is ordinarily associated with the gas outlet conduit means leading from the gas-solids separation means in order that the temperature of the gaseous stream returned to the reactor can be regulated. By proceeding in this manner, it is possible to maintain close control over the polymerization reaction temperature.

In another embodiment, the instant invention resides in a process which comprises contacting a gaseous stream containing an olefin with a mobile comminuted solid catalyst, which catalyzes the polymerization of the olefin to normally solid polymer, in a polymerization zone maintained at a temperature high enough to effect the polymerization but below the melting point of the polymer formed, removing catalyst coated with polymer from a product recovery zone disposed below the polymerization zone, the removal being effected without any pressure letdown in the polymerization zone, withdrawing a gaseous stream from the upper portion of the polymerization zone, adjusting the temperature of the withdrawn gaseous stream in accordance with the temperature maintained within the polymerization zone, and returning the gaseous stream to the polymerization zone. By proceeding in the above-described manner, it is possible to eliminate the use of a solvent or diluent in the polymerization process. Furthermore, since the instant process can produce polymer in very high yields, it is often unnecessary to treat the polymer for catalyst removal. Thus, the process of this invention can produce polymer having low ash contents, e.g., less than 0.1 weight percent ash, a product which is, in general, acceptable for all uses. As will subsequently become apparent, the instant process provides a high molecular weight product which need not be treated for catalyst removal and which is in a form very well adapted to promote ease of handling and storage.

The present invention is broadly applicable to the production of solid polymers employing solid catalysts, and more particularly to processes in which a polymerizable hydrocarbon is contacted with a fluidized catalyst in the absence of a solvent or other liquid phase material. However, the invention is especially applicable for use in the production of polymers of ethylene and copolymers of ethylene and other unsaturated hydrocarbons using a chromium oxide-containing catalyst as described in the copending U.S. patent application of J. P. Hogan and R. L. Banks, Serial No. 573,877, filed March 26, 1956, now Patent No. 2,825,721. As set forth in this application in more detail, the catalyst comprises, as an essential ingredient, chromium oxide, preferably containing a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipiated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous oxygen-containing gas, such as air. A catalyst often preferred is one in which the oxide or oxides other than chromium oxide have been treated with a fluoride, e.g., a volatile fluoride, such as hydrogen fluoride, followed by heating to remove residual volatile fluoride. A further improvement can be effected by the presence of strontium oxide in the catalyst, as set forth in more detail in the copending U.S. patent application of J. P. Hogan and R. L. Banks, Serial No.

433,804, filed June 1, 1954, now Patent No. 2,846,425. When using the above-described catalyst in the practice of the process of the instant invention, ethylene and mixtures of ethylene with other unsaturated hydrocarbons are used as the feed materials. For example, ethylene or mixtures of ethylene with minor amounts of higher 1-olefins, such as propylene, 1-butene, 1-pentene, 1-hexene, 4-methyl-1-pentene, 4-methyl-1-hexene, 5-methyl-1-hexene, 6-methyl-1-heptene, and the like, can be polymerized to give non-tacky, solid polymers. While the amount of comonomer which is ordinarily used varies with the particular 1-olefin, in general, the amount in the feed is less than that which, under the polymerization conditions employed, results in a tacky copolymer. Larger amounts of lower molecular weight than higher molecular weight 1-olefins can generally be utilized. Usually, it is preferred to use not more than 15 weight percent, more desirably not more than 10 weight percent, of the comonomer in the feed mixture.

In the practice of the process of this invention, the catalyst is employed in finely divided form having a particle size in the range of 40 to 100 mesh, preferably in the range of 60 to 100 mesh. However, it is to be understood that finer particles can be used. The preferred chromium content of the chromium oxide catalyst is in the range of 0.1 to 10 weight percent, and it is further preferred that at least 0.1 weight percent of the catalyst be chromium in the hexavalent state.

A more comprehensive understanding of the invention can be obtained by referring to the drawing which is a flow diagram illustrating a preferred embodiment of the invention. Although the invention will be described with relation to the polymerization of ethylene utilizing a specific catalyst, it is to be understood that it is not intended to so limit the invention. Thus, the invention is broadly applicable to the polymerization of polymerizable hydrocarbons in the presence of comminuted, solid catalyst.

As shown in the drawing, a gas stream containing ethylene, which enters the system through inlet line 10, is pressured into reactor 11 by means of blower 12. Catalyst is added to the ethylene stream from catalyst storage tank 13 through conduit 14. Conduit 14 can be in the form of a standpipe containing any suitable flow control means, such as star valve 16, for regulating the addition of finely divided solids to a stream of gas. The catalyst used in this particular embodiment of the invention is a chromium oxide-containing catalyst, prepared as described hereinbefore and having a particle size in the range of 40 to 100 mesh. The rate at which ethylene is charged to the system can be conveniently controlled by means of flow recorder controller 17, which is operatively connected to a flow control means, such as motor valve 18, and to orifice 19 disposed in line 10.

The catalyst entrained in the ethylene containing feed stream is passed into reactor 11 wherein the desired polymerization occurs. Reactor 11 is of special construction and comprises a series of three superposed upright shells. Intermediate shell 21, which serves as the reaction zone, is open at both ends. The upper end of shell 21 is connected to the lower end of upper shell 22 by means of inverted, frusto-conical mmeber 23. The upper end of shell 22 is closed by means of closure member 24. The upper end of lower shell 26 is connected to the lower end of intermediate shell 21 by means of another inverted frusto-conical member 27. Attached to the lower end of lower shell 26 is inverted conical closure member 28 which has outlet conduit 29 connected to its lower portion at about its apex. The lower end of conduit 29 is connected to the feed inlet of extruder 31. A gas-solids separation means, such as cyclone separator 32, is positioned in the upper portion of upper shell 22. Conduit or dip-leg 33, attached to the bottom of the cyclone, extends downwardly into the upper portion of intermediate shell 21. Line 34 connected to the upper portion of cyclone 32 provides means for removing a gaseous stream from the reactor.

The catalyst is maintained in suspension in the reaction zone encompassed by intermediate shell 21, with the reacting gas, in this case ethylene, functioning as the fluidization medium. As the polymerization proceeds, polymer forms on the surface of the catalyst particles. After a sufficient residence time, the bulk and dimensions of the polymer coated catalyst particles increase to the point where the particles can no longer remain suspended in the reaction zone. At this time, the particles drop into lower shell 26 which functions as a product knock-out zone. The polymer coated catalyst particles pass from the product knock-out zone through conduit 29 into extruder 31. Any suitable commercial extruder can be employed, a particularly suitable extruder being described in U.S. Patent Re. 23,948. The principal function of the extruder is to make possible the removal of product from the pressurized reactor system without a gas pressure letdown. The extruder also operates to remove any moisture present in the polymer and to provide a homogeneous product. The polymer product is preferably extruded from extruder 31 in the form of cylindrical strands which after cooling are conveniently chopped by means of chopper 30 into uniform lengths. As previously discussed, the instant process provides a product having a very low ash content so that further treatment of the polymer for catalyst removal is in many cases unnecessary. It is also seen that the polymer removed from the system through line 33, is in a form well adapted for ease of handling and storage.

It is to be understood that it is within the scope of the invention to pass the polymer product recovered through line 33 to suitable equipment for catalyst removal. Thus, the polymer can be passed from line 33 into an extraction zone, which can be a pressure vessel provided with a mechanical stirrer, wherein the material is contacted with a suitable solvent for the polymer. Suitable solvents are paraffinic and/or naphthenic hydrocarbons which are liquid under the conditions at which the catalyst-polymer mixture is treated. Ordinarily, paraffins and naphthenes having from 3 to 12 carbon atoms per molecule are suitable, those having at least 5 carbon atoms per molecule being preferred because of their higher solvent power. Aromatic hydrocarbons, such as benzene and the xylenes, and certain liquid olefins also act as solvents for the polymer. Since aromatic hydrocarbons have a deleterious effect on the chromium oxide catalyst, they are not preferred when the catalyst is to be returned directly to the reactor. However, where the catalyst is to be discarded or subsequently regenerated or reactivated, an aromatic hydrocarbon can be utilized for extracting the polymer product from the catalyst as can non-hydrocarbon solvents, such as carbon disulfide, and liquid halogenated compounds, such as tetrachloroethane and carbon tetrachloride. The extraction carried out in the extraction zone is conducted under a pressure sufficient to maintain the solvents substantially in the liquid phase. The temperature will depend to some extent on the characteristics of the polymer and the particular solvent used, but is ordinarily higher than the temperature in the reaction zone. Generally, a temperature in the range of 300 to 350° F. is adequate although temperatures outside of this range can be used so long as dissolution is obtained without polymer decomposition. The optimum temperature for any particular solvent and polymer is readily determined by routine tests. The resulting solution is then passed into a solids removal zone wherein it is treated by any method known in the art to remove the suspended catalyst. Such methods include filtration, centrifugation, settling, thickening, sedimentation, and the like. After removal of the catalyst from the polymer solution, the solution is then passed into a polymer recovery zone which can be any suitable means for the recovery of the polymer from the polymer solution. For example, the polymer recovery zone can comprise a series of evaporation steps as described in more detail in the copending application of Martin R. Cines, Serial No. 496,515, filed March 24, 1955. The zone can also comprise cooling and filtration equipment whereby the dissolved polymer is precipitated from solution by cooling the solution and then filtering. The solvent which is recovered from the polymer recovery zone can be recycled to the extraction zone.

Unconverted ethylene passes upwardly through the reactor into upper shell 22. As previously described, this shell has a diameter greater than that of intermediate shell 21. As a result, gases passing from the reaction zone into the zone encompassed by shell 22 undergo a velocity reduction which causes some of the solids entrained in the gas to fall back into the reaction zone. Accordingly, it is seen that shell 22 functions as a solids knock-out zone, making it possible to obtain at least a partial separation of solids from the fluidization gas. The unreacted ethylene is removed from the upper portion of shell 22 through cyclone separator 32. In the cyclone separator, any solids still contained in the ethylene stream are separated out, being returned to the reaction zone through dip-leg 33. The unreacted ethylene, now free of solid materials, is removed from the upper portion of cyclone 32 through line 34.

The unconverted ethylene recovered from the cyclone is thereafter recycled via line 10 to reactor 11. A portion of the recycle stream is passed through heat exchanger 36 which, as illustrated, comprises a fan 37 and fin-type cooling coils 38. The amount of gas passed through heat exchanger 36 is controlled so as to maintain a desired temperature in the polymerization reaction zone. This control is accomplished by utilization of temperature recorder controller 39 which is operatively connected to motor valve 41 in bypass line 42 and to the interior of shell 21. In general, the polymerization temperature within reactor 11 is maintained below the melting point of the polymer in order to prevent agglomeration of the catalyst particles and sticking of the particles to the reactor walls. Polyethylenes produced in the presence of a catalyst of the type above-described usually have melting points in the range of 240 to 260° F. Accordingly, the reaction temperature is generally controlled so as to be below this temperature range, about 150° F. ordinarily being the minimum reaction temperature. A preferred reaction temperature is within the range of 150 to 250° F. and more desirably in the range of 200 to 250° F.

The catalyst in the reaction zone encompassed by shell 21 is ordinarily in a form of a fluidized bed under "hindered-settling" conditions. Under such conditions, most of the catalyst remains in the reaction zone in the form of a turbulent mass in a dense phase. The concentration of catalyst suspended in the reaction zone can also be such that contact between individual catalyst particles is very infrequent or substantially non-existent. Thus, the concentration of suspended catalyst can be such that so-called "free-settling" conditions exist in the reaction zone, thus ensuring that no undue aggregation of catalyst particles occurs. A suitable range of catalyst concentration is from 0.1 to 5 pounds of catalyst per 100 pounds of ethylene-containing gas.

Line 46 connected to recycle line 34 provides means for removing inert gases from the system. By continuously removing a portion of the recycle stream, any large build-up of inerts in the system is prevented. It is usually desirable that the concentration of inert materials not exceed about 8 to 10 volume percent of the gaseous materials in the system. The rate at which inerts are withdrawn through line 46 is controlled by pressure recorder controller 47 which is operatively connected to motor valve 48 and to line 46. Thus, inert materials are withdrawn through line 46 at a rate such as to maintain a desired pressure in line 46. Pressure recorder controller 47 and its associated motor valve 48 also provide effective means for maintaining a desired pressure within reactor 11. It is thus seen that the rate at which inerts are removed from the system can be controlled so as to maintain a desired pressure within the reactor. The pressure to be maintained in the reactor can vary over a relatively wide range, e.g., from atmospheric pressure and below to 500 p.s.i. and above.

A more comprehensive understanding of the invention can be obtained by referring to the following illustrative example, which is not intended to be unduly limitative of the invention.

*Example*

Ethylene is polymerized utilizing a system similar to that shown in the drawing. The polymerization is carried out in the presence of a catalyst having an average size of 70 microns. The catalyst is prepared by impregnating a 90 weight percent silica, 10 weight percent alumina co-precipitated gel composite with an aqueous solution of chromium trioxide, drying, and heating for several hours in a stream of anhydrous air at about 950° F.

The reactor employed in this example comprises three shells as discussed hereinbefore. The upper shell has a diameter of about 18 feet and a height of about 8 feet, the intermediate shell has a diameter of about 9 feet and a height of about 9 feet, and the lower shell has a diameter of about 4 feet and a height of about 2 feet. A feed stream comprising about 99.5 weight percent ethylene is passed into the reactor at the rate of 100 mols per hour. The catalyst described hereinabove is charged to the reactor at the rate of 1.33 pounds of catalyst per hour. The average catalyst residence time is about 1.5 hours. The linear velocity of gases in the intermediate shell is about 2 feet per second while the linear velocity in the upper shell is about 0.5 foot per second. A pressure of about 450 p.s.i.a. is maintained within the reactor with the reaction temperature being about 210° F. Polymer coated catalyst particles of 20 mesh and larger settle into the lower shell or product knock-out zone. The polymer which is removed from the reactor through the extruder is in the form of cylindrical strands which are then chopped to the finished product form. An ultimate reactant conversion of about 99.5 weight percent is obtained.

From the foregoing, it is seen that a novel polymerization reactor system is provided which can be effectively used in the gas phase polymerization of olefins using a solid comminuted catalyst. It will be apparent to those skilled in the art that variations and modifications of the invention can be made from a study of the foregoing disclosure. Such variations and modifications are believed to be clearly within the spirit and scope of the invention.

I claim:

1. A process for producing solid polymers which comprises contacting a gaseous stream containing a polymerizable olefin with a mobile comminuted solid catalyst, which catalyzes the polymerization of said olefin to solid polymer, in a polymerization zone maintained at superatmospheric pressure and at a temperature high enough to effect said polymerization but below the melting point of the polymer formed; removing polymer from a product recovery zone into which polymer coated catalyst particles settle from said polymerization zone, the removal being effected without any pressure letdown in said polymerization zone; withdrawing a gaseous stream from the upper portion of said polymerization zone; returning said gaseous stream to said polymerization zone; and adjusting the temperature of said returned gaseous stream in response to the temperature maintained within said polymerization zone.

2. The process of claim 1 wherein said olefin is ethylene and said catalyst comprises chromium oxide and at least one member selected from the group consisting of silica, alumina, zirconia, and thoria.

3. The process of claim 2 wherein the temperature of said gaseous stream is adjusted so as to maintain a polymerization temperature in the range of 150 to 250° F.; and the pressure within said polymerization zone is maintained in the range of atmospheric pressure to 500 p.s.i. by controlling the rate at which said returned gaseous stream is introduced into said polymerization zone.

References Cited in the file of this patent

UNITED STATES PATENTS

| | | |
|---|---|---|
| 2,374,073 | Belchetz | Aug. 17, 1945 |
| 2,561,226 | Powers | July 17, 1951 |
| 2,678,904 | Kearby et al. | May 18, 1954 |
| 2,686,210 | Kirshenbaum et al. | Aug. 10, 1954 |
| 2,696,305 | Slover | Dec. 7, 1954 |
| 2,755,324 | Mueller | July 17, 1956 |
| 2,761,889 | May | Sept. 4, 1956 |
| 2,825,721 | Hogan et al. | Mar. 4, 1958 |
| 2,860,127 | Banks | Nov. 11, 1958 |
| 2,885,389 | Schappert | May 5, 1959 |
| 2,908,734 | Cottle | Oct. 13, 1959 |